United States Patent [19]

Blumenthal

[11] 4,252,989
[45] Feb. 24, 1981

[54] ADJUSTABLE SERVICE COLUMN

[75] Inventor: Martin C. Blumenthal, Montreal, Canada

[73] Assignee: CTS Corporation, Elkhart, Ind.

[21] Appl. No.: 800,414

[22] Filed: May 25, 1977

[30] Foreign Application Priority Data

Jun. 3, 1976 [CA] Canada .................................. 254016

[51] Int. Cl.³ ............................................. H02G 3/04
[52] U.S. Cl. .................................................... 174/48
[58] Field of Search ............................. 174/48, 49, 57; 362/431; D48/20 A

[56] References Cited

U.S. PATENT DOCUMENTS

| | | | |
|---|---|---|---|
| 1,820,824 | 8/1931 | Phiffer .................................. | 174/57 |
| 3,345,022 | 8/1967 | Jorgensen .......................... | 174/48 X |
| 3,609,211 | 9/1971 | Van Herk ............................. | 174/49 |
| 3,649,741 | 3/1972 | Fremont ................................ | 174/48 |
| 3,710,530 | 1/1973 | Valtonen ........................... | 174/48 X |
| 3,888,282 | 6/1975 | Liddall .............................. | 174/48 X |
| 3,889,044 | 6/1975 | Flachbarth et al. .................. | 174/48 |

FOREIGN PATENT DOCUMENTS 1159189 7/1969 United Kingdom ...................... 174/48

Primary Examiner—B. A. Reynolds
Assistant Examiner—D. A. Tone
Attorney, Agent, or Firm—John A. Young; Larry J. Palguta

[57] ABSTRACT

A service column comprising a pair of channels in a main member for receiving electrical conductors providing power and communication services from above a suspended ceiling to a work area in an office. The suspended ceiling contains inverted T-rails supporting a plurality of ceiling panels. An adapter bracket assembly fastened to the upper end of the main member of the service column secures the main member to one of the inverted T-rails. The inverted T-rail supporting the service column is defined by two split legs joined together by a web. The adapter bracket assembly abuts against the web and a double C-clamp secured to the adapter bracket assembly with a fastener grippingly engages the split legs of the inverted T-rail. A standard secured to the lower end of the main member of the service column adjustably supports the column from the floor and a sleeve slideable over the main member conceals the standard from external view.

6 Claims, 5 Drawing Figures

ADJUSTABLE SERVICE COLUMN

The present invention relates to a service column for providing power and communication services from above a suspended ceiling to a work area in an office and, more particularly, to a service column having an adapter bracket assembly for securing the column to an inverted T-rail in a suspended ceiling and means for adjustably supporting the column from the floor.

The present trend of office design is to reduce the number of permanent walls and partitions separating work areas in an office and replace some of the walls with portably designed room dividers. In many offices, permanent walls are not practical for economical reasons, e.g., frequent rearranging of work areas occurs within the office. Since each work area in an office requires separate outlets for providing power and communication services, readily movable service columns containing power and communication conductors are provided for connecting services located above a suspended ceiling to work areas in such offices. The suspended ceiling generally includes a plurality of ceiling panels supported by inverted T-rails. The service columns are also supported by and secured to the inverted T-rails. When a person accidentally bumps one of the service columns, the force from the bump is transferred from the service column to the inverted T-rail sometimes resulting in permanent deformation of the T-rail. The strength of an inverted T-rail can be increased by splitting the T-rail and joining the two split sections with a web. In addition, when the service column is secured directly to the bottom side of an inverted T-rail having a web, it is unnecessary to cut out new openings in the ceiling panels as required with currently available service columns such as the column shown in Canadian Pat. No. 986,039. It would be desirable, therefore, to provide means for detachably securing a service column to an inverted T-rail having a pair of split legs.

Regardless of the construction of an office building, the distance between the suspended ceiling and the floor generally varies since it is desirable to maintain the ceiling in a single plane. The service column described in Canadian Pat. No. 986,039 is provided with securing means that compensates for the nonuniform floor to ceiling dimension when securing the service column to an inverted T-rail. Although such service columns are satisfactory when located between a pair of inverted T-rails, it would be desirable to secure a service column directly in line with one of the inverted T-rails and provide adjustable means in the main member of the service column for compensating for the irregular distances between the inverted T-rails of the suspended ceiling and the floor.

Accordingly, it is a general object of the present invention to provide an improved service column for transporting electrical services distributed above a suspended ceiling supported by inverted T-rails to a work area. Another object of the present invention is to provide an improved service column having an adapter bracket assembly for securing the service column to an inverted T-rail having a pair of split legs and having adjustable means for supporting the main member of the service column above the floor of such ceiling. Another object of the present invention is to provide an improved service column having a sleeve telescopically engaging the lower portion of the main member of the service column for concealing a standard adjustably supporting the main member above the floor. Still another object of the present invention is to provide a service column having an adapter bracket assembly securable to the underside of an inverted T-rail having a pair of split legs for connection to a double C-clamp engageable with the split legs of the T-rail. Yet another object of the present invention is to provide an improved service column with a standard fixedly secured to the lower portion of the main member of the column for supporting the column above the floor when the distance between the column and the inverted T-rail varies. Further objects and advantages of the present invention will be pointed out with particularity in the claims annexed to and forming a part of this specification.

Briefly, the present invention is concerned with a service column comprising a main member adapted for vertical disposition between the floor and a suspended ceiling containing ceiling panels supported by inverted T-rails. One of the inverted T-rails has a pair of split legs joined together by a web. An adapter bracket assembly is secured to the upper portion of the main member for locating the service column against the underside of the web and between the split legs of the inverted T-rail. A double C-clamp engageable with the upper ends of the split legs of the inverted T-rail is connected to the adapter bracket assembly with a fastener and rigidly secures the service column to the inverted T-rail. A standard adjustably secured to the lower portion of the main member of the service column compensates for different distances between the suspended ceiling and the floor and a sleeve fitting over the lower portion of the main member conceals the standard from external view. In a preferred form of the invention, the adapter bracket assembly is provided with a pair of shoulders abuttable against the underside of the web and with a neck in registry with an opening provided in the center portion of the web. The fastener secures the double C-clamp to the neck of the adapter bracket assembly.

For a better understanding of the present invention, reference may be had to the accompanying drawings wherein the same reference numerals have been applied to like parts and wherein:

FIG. 3 is a fragmentary sectional view taken along line III—III of FIG. 2 assuming FIG. 2 is shown in full;

Figures 1, 2, 3, 4, 5:
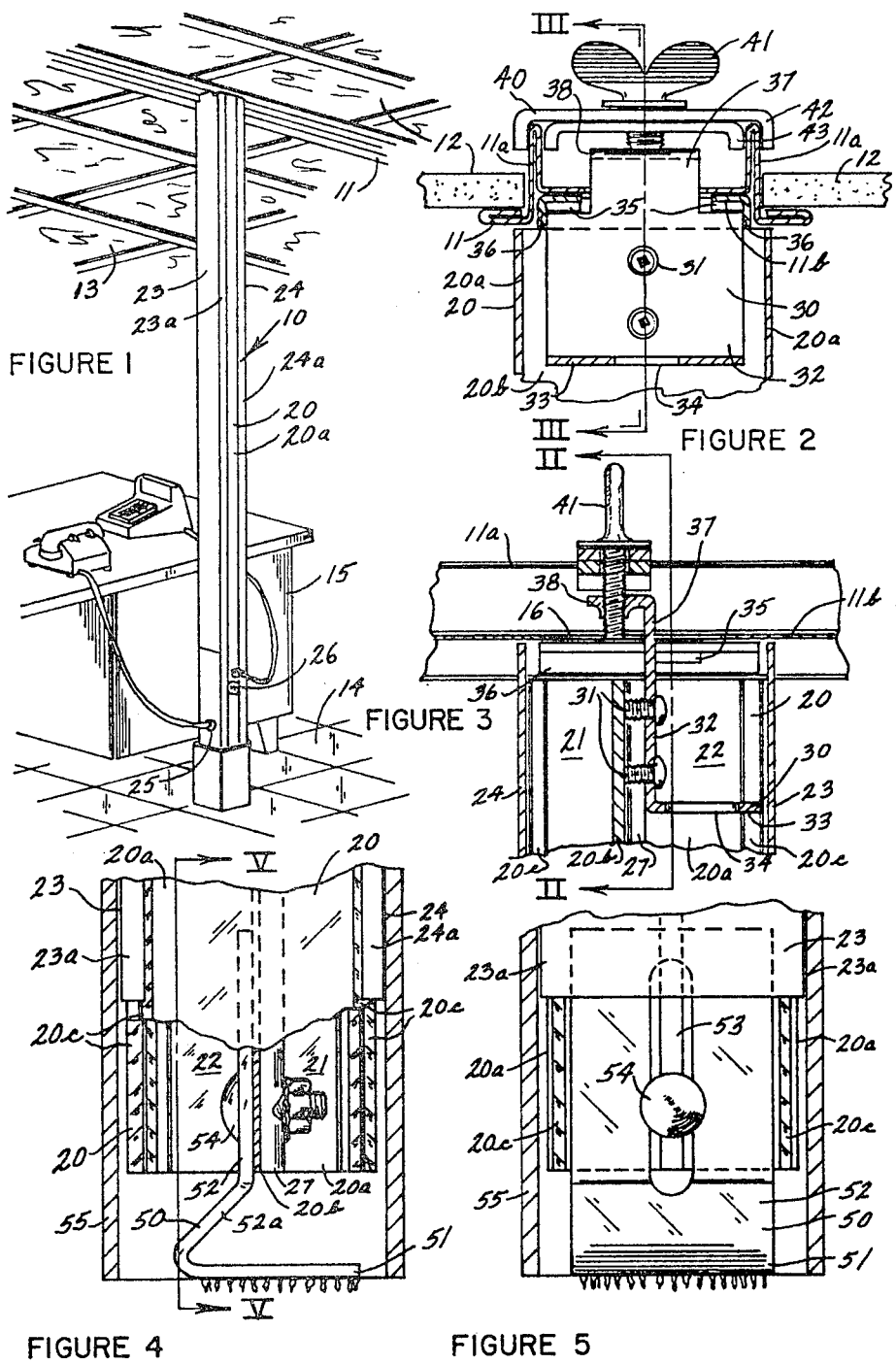
FIG. 1 is a view of a service column built in accord with the present invention and installed in a work area of an office building.
FIG. 2 is a fragmentary sectional view taken along line II—II of FIG. 3, assuming
FIG. 3 is shown in full, of the upper portion of the adapter bracket assembly securing the main member of the service column to an inverted T-rail.

FIG. 4 is a fragmentary section of the bottom portion of the service column shown in FIG. 1 with a portion of the slideable sleeve fitting over the main member of the service column removed to show a standard fixedly secured to and supporting the main member above the floor; and FIG. 5 is a fragmentary sectional view of the bottom portion of the service column taken along lines V—V of FIG. 4, assuming that FIG. 4 is shown in full.

Referring now to the drawings, there is illustrated a service column, generally indicated at 10, connected to an inverted T-rail 11 supporting panels 12 of a suspended ceiling 13 and supported by the floor 14 of a work area 15. The inverted T-rail 11 (see FIG. 2) has a pair of split legs 11a joined together by a web 11b. The service column 10 comprises a main member 20 extending from slightly above the floor to the ceiling 13. An adapter bracket assembly 30 locates the main member 20 of the column 10 against the web 11b between the split legs 11a of the inverted T-rail 11. The main member 20 preferably is an aluminum extrusion having a generally H-shaped cross section providing two longitudinal channels 21, 22 defined by a pair of spaced vertical plates 20a separated by a center plate 20b integral with and normal to the vertical plates. A pair of longitudinal covers 23, 24, each having a pair of inwardly extending lateral flanges 23a, 24a interlocked with the matable flanges 20c (see FIG. 4) of the main member 20 are detachably secured to the main member 20 and close the channels 21, 22. Preferably, one of the channels 21 provides conductor space for power services while the other channel 22 provides conductor space for communication services, e.g., a telephone line, to the work area 15. Telephone outlets 25 are provided in one of the covers 23 and electrical receptacles 26 are secured to the main member 20, as best shown in FIG. 1 of the drawings. Further details regarding the securement of the covers 23, 24 to the main member 20 and the services are obtainable from Canadian Pat. No. 986,039.

In order to connect the service column 10 to the inverted T-rail 11, the adapter bracket assembly 30 is fixedly secured to the upper end of the main member 20 as shown in FIGS. 2 and 3 of the drawings. Preferably and in accord with the present invention, the adapter bracket assembly 30 is secured directly to the center plate 20b with a pair of fasteners 31 such as self-threading screws received in holes provided in the body portion 32 of the adapter bracket assembly and anchored in an elongated groove 27 formed in the center plate 20b thereby permitting adjustment of the adapter bracket assembly with respect to the main member 20. The fasteners 31 threadedly engage the walls of the groove 27 anywhere along its length. For the purpose of supporting a not shown strain relief bushing at the upper end of the service column, the adapter bracket assembly is provided with a laterally extending member 33 integral with the lower end of the body portion 32 and an opening 34 is provided in the member 33 for receiving the strain relief bushing. A pair of spaced shoulders 35 (see FIGS. 2 and 3) extend laterally from the upper end of the body portion 32 of the adapter bracket assembly 30. Preferably a pair of inverted L-shaped support pads 36 in allochiral relationship are suitably secured to the shoulders, such as by spot welding, to increase the surface engagement of the adapter bracket assembly 30 against the underside of the web 11b of the inverted T-rail 11 when the assembly 30 is drawn against the inverted T-rail 11.

As best shown in FIG. 3 of the drawings, the L-shaped support pads 36 have a length slightly less than the distance between the covers 23 and 24 thereby being concealed by the covers when the service column is assembled to the inverted T-rail. A neck 37 extending upwardly from the body portion 32 of the adapter bracket assembly and between the spaced shoulders 35 is received in an opening 16 provided in the web of the inverted T-rail 11.

In accord with the present invention, the adapter bracket assembly 30 is secured to the inverted T-rail with a double C-clamp 40 engageable with the split legs 11a of the inverted T-rail 11. A suitable fastener 41, such as a wing headed screw passes through an opening provided in the double C-clamp 40 and threadedly engages the lateral upper end 38 of the neck 37 of the adapter bracket assembly 30. Specifically, the double C-clamp 40 is defined by an outer C-clamp 42 and an inner C-clamp 43 (see FIG. 2), the lateral members of the inner and outer C-clamps defining a space therebetween for receiving the upper ends of the split legs 11a of the inverted T-rail 11. The upper end of the service column 10 can, therefore, be secured to the inverted T-rail 11 in a simple and facile manner by locating the upper end of the service column 10 against the underside of the web with the neck 37 of the adapter bracket assembly 30 projecting through an opening 16 in the web, placing the double C-clamp 40 over the upper ends of the split legs 11a, and then fixedly securing the double C-clamp 40 to the adapter bracket assembly 30 with the fastener 41.

Although it is desirable to have the suspended ceiling 13 equally spaced from and parallel to the floor 14, it is preferable to maintain the ceiling in a single plane; therefore, the specific distance from the ceiling 13 to the floor 14 generally varies sufficiently to require adjustable means in the service column. Preferably and in accord with the present invention, the service column 10 is provided with adjustable means 50 (see FIGS. 4 and 5) for supporting the service column above the floor. The adjustable means is a standard 50 and comprises a foot 51 supported on the floor 14 and a leg 52 having a slight reverse bend 52a extends upwardly into the lower portion of the main member 20 of the service column 10. A suitable fastener 54 secures the standard 50 to the main member 20. Specifically, the leg 52 of the standard 50 is provided with a centrally disposed elongated slot 53 and the fastener 54 including a bolt is received in the slot and passes through a hole in the center plate 20b of the main member. A nut threadedly engages the bolt and fixedly secures the standard to the main member. A sleeve 55 telescopically fits over the lower portion of the service column 16 and conceals the fastener and the standard from external view.

When it is desirable to relocate the service column 10 in the work area, it is merely necessary to lift up the sleeve exposing the standard and the fastener securing the standard to the main member and loosen the nut on the bolt. At the upper end of the service column above the inverted T-rail, the wing headed fastener 41 is removed to separate the double C-clamp 40 from the adapter bracket assembly 30. The service column can then be readily repositioned along the web of the same inverted T-rail or another T-rail and reconnected at the new location after another aperture or opening such as the opening 16 is provided in the web 11b.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. In combination, a service column and an inverted T-rail supporting a suspended ceiling of a building and secured to the service column, the inverted T-rail comprising a pair of split legs, and a web having a bottom surface and a top surface, said web maintaining a fixed laterally spaced relation between said split legs to maintain the split legs together, the service column comprising an H-beam having a pair of spaced vertical plates and a center plate integral with and normal to the vertical plates and partioning the service column into a pair of longitudinal channels, an adapter bracket assembly secured to the upper end of the center plate and provided with an opening, a strain relief bushing disposed within said opening, said adapter bracket assembly abutting against the bottom surface of the web of said T-rail, the opening of said bracket assembly for receiving the bushing communicating with one of the pair of longitudinal channels, a clamp engaging one of the ends of each of the pair of split legs of said T-rail, said web being spaced from said clamp and integral with the ends of each of the pair of split legs of said T-rail, and means forming spaced openings in the web of said inverted T-rail and proportioned to receive the neck of said associated bracket assembly to effect a positive connection of the service column, and clamping means for drawing the end of the column upwardly and concurrently urging said clamp downwardly against said T-rail to maintain the locked relation of said bracket assembly and T-rail through said means forming the spaced openings.

2. The combination of claim 1, wherein the adapter bracket assembly comprises a body portion fixedly secured to the center plate, a laterally extending member is integral with one end of the body portion, the laterally extending member is provided with the opening for receiving the strain relief bushing, a pair of spaced shoulders extend laterally from the other end of the body portion and abut against the web spacing the split legs of the inverted T-rail, a neck extends upwardly from the body portion through one of the spaced openings formed by said means and a fastener secures the neck to the clamp.

3. The combination of claim 1, wherein the center plate is provided with a longitudinal groove, and a fastener anchored in the groove secures the adapter bracket assembly to the H-beam.

4. The combination of claim 1, wherein the clamp is a double C-clamp and comprises an outer C-clamp and an inner C-clamp fixedly secured to the outer C-clamp, each of the C-clamps having lateral members, the lateral members of the inner C-clamp and the outer C-clamp define a space adapted to receive the split legs of the T-rail.

5. The combination of claim 1, wherein a standard adjustably supports the lower end of the H-beam from the floor and comprises a foot supported by the floor, a leg extending upwardly from the foot, the leg is provided with an elongated slot, and a fastener received in the elongated slot fixedly secures the standard to the center plate of the H-beam.

6. The combination of claim 1, wherein the adapter bracket assembly is provided with a pair of holes, a first fastener in one of the holes secures the adapter bracket assembly to the H-beam, and a second fastener in the other hole engages the clamp.

* * * * *